Oct. 23, 1962   J. R. JOHNSON   3,060,057
METHOD AND APPARATUS FOR CONTROLLING DISTRIBUTION
OF PLASTIC COATINGS ON ARTICLES
Filed Aug. 21, 1959   4 Sheets-Sheet 1
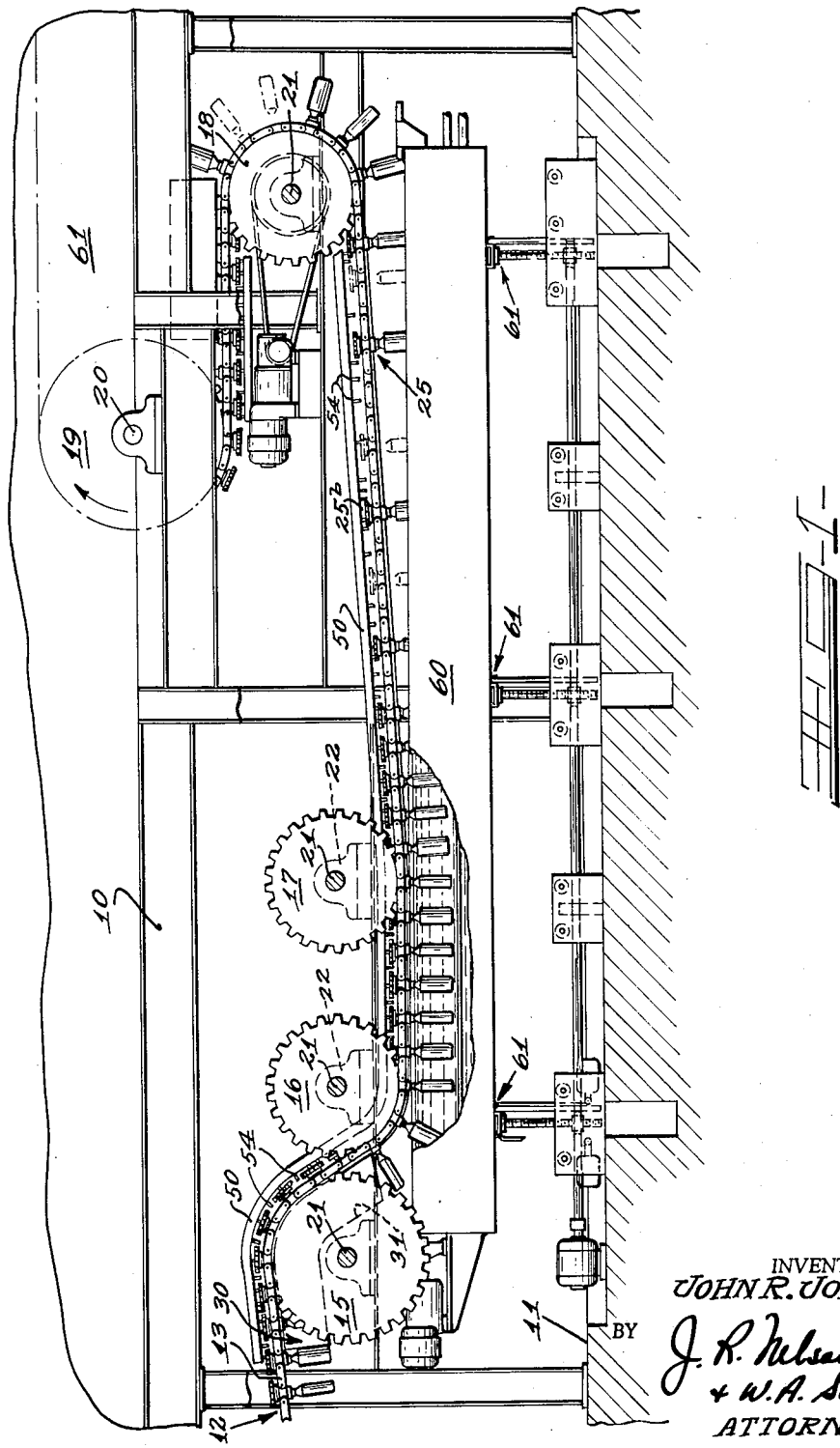
INVENTOR.
JOHN R. JOHNSON
BY
J. R. Nelson
+ W. A. Schaich
ATTORNEYS

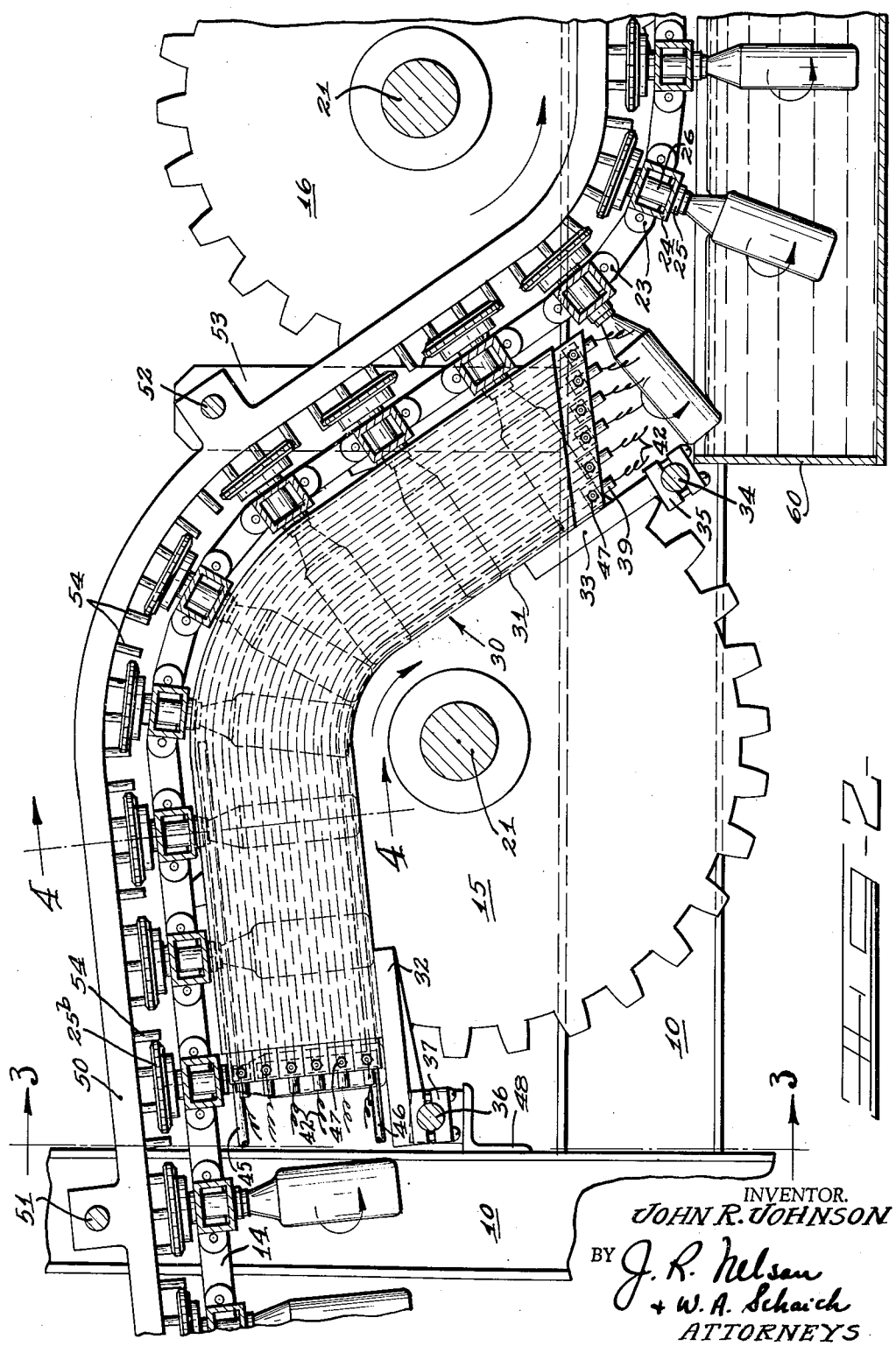

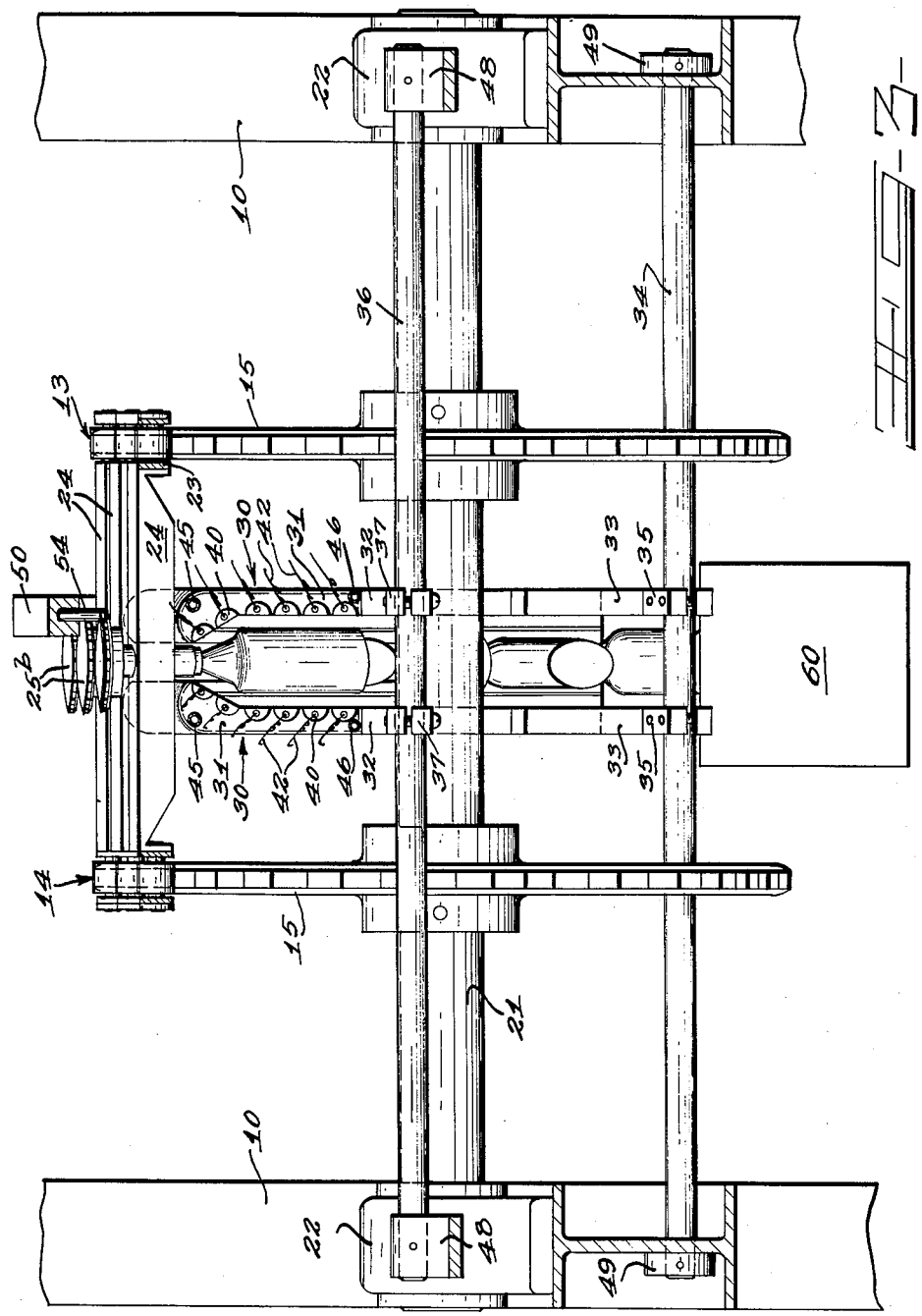

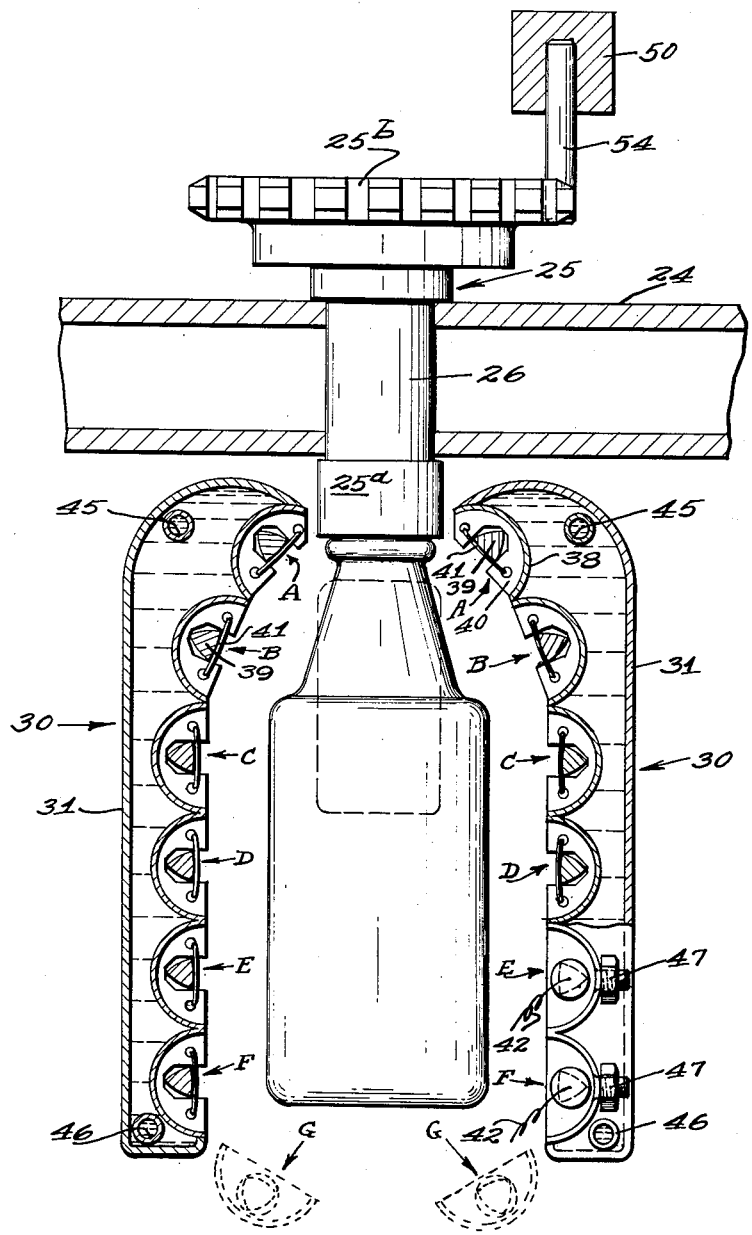

3,060,057
METHOD AND APPARATUS FOR CONTROLLING DISTRIBUTION OF PLASTIC COATINGS ON ARTICLES

John R. Johnson, Toledo, Ohio, assignor to Owens-Illinois Glass Company, a corporation of Ohio
Filed Aug. 21, 1959, Ser. No. 835,358
11 Claims. (Cl. 117—54)

This invention relates to method and apparatus for controlling the distribution of a coating of plastic applied to articles, such as glass bottles and the like, by heat-conditioning the articles through application of controlled, localized heat to a selected surface area thereof just prior to application of the plastic coating.

The invention is applicable to the coating of articles of various sizes and shapes with a wide range of coating materials, such that the coating is applied in liquid condition and subsequently allowed to gel or set. In a specific form, the invention has been developed in connection with the coating of glass containers, such as bottles, jars, or the like, by dipping preheated bottles into a bath of plastisol coating material. One of the characteristics of such a material is its tendency to thinly coat sharp corners or contours of the article in comparison to the other regular surfaces thereof. Thus, the coating tends to draw thin at any pronounced projection on the article surface, such as a corner, shoulder, etc. Heretofore, in order to obtain adequate thickness of coating at these projecting surface areas, the other more easily coated areas needed to be coated much thicker than is necessary or desirable. This results in an uneven coating, wherein the material is distributed in an undesirable fashion. Since these plastics are relatively costly, the control over their distribution about the coating is very desirable from an economic standpoint. However, from the standpoint of appearance, it is also important that the coating distribution be accurately controlled.

A further problem in connection with the application of these plastic coatings arises due to the tendency of the material to run and draw away from the sharp contours of the article to form what may be described as "sags" in the coating.

It is, therefore, an object of the invention to provide a means for overcoming the foregoing undesirable distribution of the plastic of the coating by applying controlled, localized heat to the selected areas of the bottle where applied coatings would be otherwise too thin or inadequate, and thereafter apply the plastic coating to the glass to effect the desired distribution throughout the coated surface of the article.

Another object of the invention is to provide a method for controlling distribution of plastic coatings on glass bottles so as to obtain thicker coatings on the more pronounced projecting surfaces of the bottle, such as corners or sharp edges thereon, and to eliminate any tendency for sags to occur due to flow of material in the coating after it is applied to the glass bottle.

Another object of the invention is to provide a method and apparatus for applying controlled, localized heat to a selected surface area of the glass article in addition to the preheat treatment of the article, and while the article is in motion in a continuous coating process, to thereby obtain more accurately controlled distribution of the coating applied during dipping, and control the flow of the material on the coating applied through dipping the article into a bath of the plastic coating material.

A still further object of the invention is to provide novel apparatus for attaining the foregoing objects.

The above objects, as well as other objects and advantages of the invention, will be apparent to those skilled in the art from the following detailed description, taken in conjunction with the annexed sheets of drawings, on which there is presented for purposes of illustration only, a preferred and practical embodiment of the invention.

In the drawings:

FIG. 1 is an elevational view, with parts broken away, showing a preferred form of the invention as employed on a machine having utility for the manufacture of vinyl resin coated glass articles, such as glass aerosol bottles.

FIG. 2 is an enlarged elevational view of the apparatus of the invention for applying localized surface heat to various areas of glass bottles as they are moved therethrough.

FIG. 3 is an end sectional elevational view taken along lines 3—3 of FIG. 2, which shows localized heating of the bottles by advancing through opposed far infra-red heat sources, and thence coated by movement into a tank containing the plastic coating material.

FIG. 4 is an enlarged, detailed, end, sectional, elevational view taken along lines 4—4 of FIG. 2, and illustrates novel apparatus possessing flexibility for heat-conditioning articles of various sizes and shapes.

In generally describing the method of the invention for obtaining the aforementioned improved coating distribution, the articles may be initially prepared by preheating them in an oven. This preheat will be applied to heat the entire article substantially uniformly throughout. At the time of applying the coating, such as by dipping the glass articles into a bath of plastisol maintained at a given bath temperature, the temperature of the glass for any given length of time the article is immersed in the bath will control the amount of plastisol that can gel and form a thickness of coating on the glass surface. The overall coating may be adjusted by varying the preheat temperature of the glass. Basically, as soon as the temperature of the glass article that is immersed into the plastisol decreases to a point where gelation of that material will no longer occur, the plastic coating which may be obtained is established. Hence, the overall coating may be predetermined and readily varied by adjusting the temperature condition of the glass articles at the time they are dipped. Thus, in the present method, the articles are preheated to the temperature that will yield the desired thickness of the coating. The extent of this preheat will, of course, depend upon the plastic material being used. It has been found that in applying coatings of a plastic material, such as a typical plastisol, to a glass article, for example a bottle, the preheat should be in the range of 200° F. to 300° F. Immediately after preheating, or even coincident with preheating, the article is given a localized heating at the surface areas selected as those areas where the coating will otherwise tend to draw thin, such as the aforementioned pronounced projections on the articles, or sharp corners, shoulders, corner seams, etc. This may be accomplished, as is illustrated herein, by moving the articles through a heat-conditioning zone, whereat bands or defined strips of heat are radiated from a source located in close proximity to that selected surface area of the article at which the thickness of the coating is to be supplemented. This heat is applied while the article is moving in a fixed path through that zone. The article is also rotated during its movement in this zone. As many radiant heat sources as may be needed to properly condition select areas which include sharp contours of the article may be employed in order to reinforce the subsequently applied coating thereat. As may be expected, some articles will have more of these sharp contours than others. In the more complex shapes, wherein are found many pronounced projecting surfaces or sharp contours, the application of the localized heat will, of course, be applied according to the coating that is desired. As between these various sharp contours or projecting surfaces, the localized heating may be applied in varying amounts so that the ultimate coating thereat is the same on each, or the coating made to be thicker at some of these surfaces as compared with others.

Immediately after these surface areas are locally heated, the plastic coating is applied to the article. This may be accomplished in various ways—for example, by dipping the article to a desired level or elevation into a bath of the coating material maintained in liquid condition at the temperature and viscosity best suited for applying a coating by dipping.

The localized heating of the selected surface areas of the article may be controlled either by regulation of the heat generated by the various radiant heaters, or by their spaced relationship to the selected surface area of the article, or by a combination of both.

One of the primary uses for which this invention has been developed is in the production of plastic coated glass bottles from which glass aerosol packages may be made. For purposes of describing the preferred embodiment of the invention, it will be particularly described in that connection; however, it should be distinctly understood that the principles of this invention are equally applicable to the production of plastic coated articles of various types, sizes, and shapes.

As a practical illustration of the invention, a preferred embodiment, including the novel apparatus capable of performing the method, will now be described.

Referring to FIG. 1 of the drawings, a structural frame 10 is supported on a floor 11. This figure shows, in part, a machine capable of continuous manufacture of a variety of plastisol coated articles, including plastisol coated bottles ("glass aerosols"), plastisol coated glass bobbins, etc. The machine includes a movable carriage, indicated generally at 12, comprised of two parallel, endless reaches of chain 13 and 14 (see also FIG. 3), which are in mesh successively with the teeth of pairs of parallel and similarly spaced-apart sprockets 15, 16, 17, 18, and 19. The carriage is driven continuously by driving the sprockets 19 through any suitable driving means connected with drive shaft 20. Each pair of the other mentioned sprockets (15–18) is keyed onto a horizontal shaft, as indicated by 21. Each of the shafts 21 is mounted in conventional journal bearings, as shown at 22, so that all of the shafts are parallel with the drive shaft 20. The chains 13 and 14 are made up of individual links, successively connected, the links engaging teeth of the aforementioned sprockets. At equally spaced distances along the chains 13 and 14 are included special links 23 (FIGS. 2 and 3) for fastening cross bars 24 which are disposed parallel to each other and extend between the chains 13 and 14. The combination of the chains and the cross bars provides a carriage for a plurality of bottle chucks 25, which are each rotatably mounted on the cross bars 24 by a bushing 26. The chucks 25 are disposed to be perpendicularly dependent from the cross bars. The details of the chucks are disclosed in my U.S. Patent No. 2,882,-061, and are operable to hold the bottles, such as are herein indicated, by insertion of expansible jaws through their end openings to internally grip the bottles by their necks. Thus, the combination of the chains 13 and 14, the cross bars 24, and the chucks 25 comprises a movable carriage means for bottles or other similar articles to be treated. The carriage just mentioned has a fixed path of movement defined by the engagement of the chains over the sprockets. For the sake of simplicity of illustration, one longitudinal line of the chucks on the cross bars 24 is disclosed herein; however, any number of lines may be constructed and accommodated on the movable carriage within the limits of the span of the cross bars. Four such lines of chucks have been found to operate satisfactorily, and it is contemplated that even more lines would be practical.

The just described movable carriage is continuously moved in one direction by a drive motor and driven geared speed reduction unit (not shown) drivably connected through a coupling on the drive shaft 20 for rotating the drive sprockets 19 in the clockwise direction, as viewed on FIG. 1. This will cause the chucks and their bottles to be moved from left to right on FIGS. 1 and 2.

At the extreme lefthand side of FIG. 1, the bottles are shown as they are brought from a preheat oven chamber (not shown), through which they were carried and elevated in temperature throughout. This preheat elevated the overall heat of the bottles to a temperature on the order of 200° F. to 300° F. The foregoing stated temperature is, therefore, but an example of preheat conditions suitable for subsequently applying a coating of a typical plastisol material by dipping. The extent of the preheat of the bottles will depend on the plastic material being used, and the desired overall thickness of coating to be applied.

Immediately following the just described preheat treatment of the bottles, they are next brought to the heat-conditioning zone for treatment under the principles of the present invention. As shown on the drawings, this heat-conditioning zone is located in the path of movement prescribed for the bottles as the carriage chains travel about the periphery of the sprockets 15. Mounted on either side of the path that the bottles will take are opposed radiant heaters, indicated generally as 30. Each of the heaters 30 is comprised of a casing 31 which extends longitudinally in parallel with the path of the bottles as they are brought between the sprockets 15 (FIG. 2). As seen on FIG. 4, each of the casings 31 is supported by brackets 32 and 33 attached near the respective opposite ends of the casings. The brackets 33 are fastened to the transverse rod 34 by journaled clamps 35 (FIG. 3). The transverse rod 34 extends laterally between beams of the frame 10, and through holes in the I-beams where they are held by pinned collars 49. The brackets 32 are similarly mounted on a transverse rod 36 extending laterally of the frame 10 forward of the periphery of the gears 15, and held on brackets 48. These brackets are fastened to rod 36 by journal clamps 37. On each of the casings 31 is a plurality of radiant heaters which take the form of far infra-red type heat sources. Each of the radiant heaters is comprised of a reflector 38 and a filament 39. The filaments 39 are held in place by the webs 40 and a lacing 41. The filament 39 extends longitudinally throughout the casings 31 and is fastened at the ends to the casing by bolt clamps 47. The filaments 39 are independently energized electrically by having their end wires 42 connected in an electric energizing circuit (not shown). Each of the radiant heaters is individually energized and regulable by suitable controls (not shown) to radiate a narrow elongated band or strip of far infra-red heat. This type of heat has a greater intensity of heating than an infra-red type heater, such as generated by an incandescent infra-red lamp. Several far infra-red units are commercially available, two examples being Calrod radiant heater units and Chromalox radiant heater units. These employ filament windings about a ceramic core. Another type of far infra-red unit presently available is the tungsten-quartz unit comprised of a tungsten filament in a quartz enclosure, much like the unit illustrated on FIG. 4.

These radiant heaters which comprise the heat sources are arranged in opposed pairs extending on either side of the bottle path and are located at equally spaced distances from the bottle surface. The heaters have been given identification Nos. A–F along opposite sides of the bottle. With reference to FIG. 4, the example of the bottle shown in solid outline represents the larger size of bottle that may be heated by the heater 30. It presents sharp contours opposite the pairs of heaters labeled B and C at the shoulder of the bottle, and opposite the heaters labeled F at the bottom corner of the bottle. Thus, the selected surface area about the shoulder may be heated locally in a controlled fashion by regulating individually the heat generated from the radiant heaters B and the heaters C. The selected surface area near the bottom corner of the bottle may be locally heated by regulation of the heat generated from the radiant heaters F.

The dotted bottle outline on FIG. 4 illustrates the smaller size of bottle that may be treated by the heater 30. It presents similar sharp contours at the shoulder and bottom corners, but, obviously, at a spaced relationship to the heaters different from the above-mentioned bottle. Thus, the select surface area about the shoulder may be heated locally in controlled fashion by regulating individually the heat generated from the radiant heaters A. The surface area near the bottom corner of the bottle and some of the bottom area may be locally heated by regulation of the heat generated from the radiant heaters C and D. Thus, it should be apparent for different sizes and shapes of bottles, the various heaters may be brought into operation to obtain the desired surface heat on the glass surface of any selected area.

FIG. 4 shows (in outline only) two heaters G, which may be mounted to project heat toward the bottom surface of the bottle. This could be beneficial in applying heat to a portion of the bottoms of bottles that present a hard-to-coat surface, such as a "push up" bottom.

A coolant is supplied to the interior of each of the casings 31 at an inlet pipe 45. This coolant is exhausted at an outlet pipe 46. The coolant is applied to the back side of the reflectors 38 to cool them and prevent distortion or warpage of the units. During the movement of the bottles through the heat-conditioning zone between the radiant heaters just described, they are rotated about their central axis by rotating the chucks 25. As seen on FIG. 4, the chucks have a cylindrical body portion housed in the bushing 26, and attached integrally with this body portion is a pinion 25b. In a tangential, overlying relationship with the teeth of the pinions is a rail 50, which is supported by a rod 51 extending laterally between the members of the frame 10 and a rod 52 extending between spaced standards 53 supported on the frame 10. The rail extends parallel to the path of movement of the chucks as they travel with the moving carriage. The rail has a series of depending pins 54, which are spaced apart to coincide and mesh with the teeth of each of the pinions 25b, and may be likened, in effect, to a stationary set of rack gear teeth. Thus, as the chucks 25 are advanced past the stationary pins 54, the teeth of the pinions 25b mesh with the pins and rotate the body portion of the chucks in the bushing mounting on the cross members so as to rotate the bottle held by each chuck about its central axis.

As shown on FIG. 1, the pins 54 extend longitudinally of the path of the chucks beginning near the point where the bottles are brought between the radiant heaters (left-hand side of FIG. 7), throughout the span of movement through the heat-conditioning zone and along the dipping tank.

In the movement of the carriage throughout its fixed path, the bottles are removed from between the radiant heaters and consecutively brought to the dipping zone, whereat the heat-conditioned bottles are dipped into the plastic coating material, and the coating applied. For this purpose, a multi-compartmented, elongated dip tank 60 is supported on the pedestal assemblies 61 adjusted to the proper elevation for obtaining the desired level or elevation of coating of the plastic on the bottles. A bath of the plastic coating material is maintained at the proper temperature and viscosity for applying the coating of plastic as the bottles are dipped into the upper compartment of the tank 60. In dipping the bottles, they are successively moved by the carriage in a downwardly inclined path until they are immersed in full dip elevation in the bath of the material. This downwardly inclined movement for the carriage is provided by the sprockets 15 and 16. After the bottles have been brought into full dip, they are thereafter moved in a horizontal path between the sprockets 16 and 17. During this movement, the pinions 25b of the chucks are rotated by meshing engagement with pins 24 on the rail 50. As the carriage advances the bottles beyond the sprockets 17, they are gradually moved in an upwardly inclined direction toward the periphery of the sprockets 18. In such a fashion, the bottles are dipped into the bath of material in the tank and maintained therein sufficiently for the coating to form thereon. After the coating has once had time to become established, the bottles are gradually removed from the material, and any excess allowed to drip or run from the bottles back to the tank.

Thereafter, the coated bottles are deteared while moving about the periphery of the sprockets 18, and next baked by being carried through an overhead baking oven 61.

The foregoing described treatment of a bottle in applying a plastic coating thereto is an example of the attainment of the objectives of the present invention. It will, of course, be understood that various details of the construction and procedures disclosed may be modified throughout a wide range without departing from the principles of this invention, and it is not the purpose to limit the patent granted hereon otherwise than necessitated by the scope of the appended claims.

I claim:

1. In the art of applying plastic coatings to glass articles having sharp or pronounced contours, the method of controlling distribution of the coating on said articles comprising moving the said articles through a heat conditioning zone, applying controlled, localized heat to selected surface areas of said articles throughout that zone, said selected areas being about said pronounced contours of the article, whereby these areas are heated above the temperature of the other areas of the article, and immediately thereafter dipping the heat conditioned articles into a bath of a liquid organic plastisol material to form a uniform coating thereon.

2. In the art of applying plastic coatings to glass articles having sharp or pronounced contours, the method of controlling distribution of the coating on said articles comprising moving the said articles through a heat conditioning zone, rotating the articles about their axes during said movement, applying controlled, localized heat to selected surface areas of said articles throughout that zone, said selected areas being about said pronounced contours of the article, whereby these areas are heated above the temperature of other adjacent areas of the article, and immediately thereafter applying a liquid organic plastisol material to the articles to form a uniform coating thereon.

3. In the art of manufacture of plastisol coated glass bottles, the method of controlling distribution of the coating on said bottles comprising preheating the bottles to a predetermined temperature, applying additional and controlled, localized heat to select surface areas of the bottle, which areas include a pronounced or sharp contour thereon, to elevate the temperature of the glass at said locally heated area above said predetermined preheat temperature, and immediately thereafter applying the coating on the bottles by dipping them in a bath of liquid organic plastisol gelable by heated condition of the bottles, a coating being formed encompassing the dipped surface area of the bottle, the thickness of the coating being related to said heat condition of the adjacent glass surface.

4. In a continuous process for the manufacture of plastic coated glass bottles having sharp or pronounced contours wherein the bottles are continuously moved in succession through a fixed path for treatment, including preheat treatment of the bottles, comprising the steps of moving the bottles through a defined zone of controlled far infra-red heat located opposite selected exterior surface areas, which areas include said pronounced contours of the bottle, to increase the temperature of the glass at those areas above the temperature provided by said preheat treatment, immediately thereafter moving the bottles into a liquid bath or organic plastisol material to form a coating thereon, said coating being formed to provide a uniform layer overlying said coated areas of the bottle in response to the heated condition of the bottles, and thereafter removing the coated bottles from said bath and curing the coating on the bottle.

5. In a machine having a traveling carriage moving through a fixed path of travel, said carriage including a plurality of article chucks rotatably mounted thereon for carrying articles with their axes perpendicular to the path of travel of the carriage for treatment of the articles, the combination therewith of a pair of heater casings, means for mounting said casings on the machine in spaced apart relationship disposed on opposite sides of the articles on the chucks and extending along a portion of said fixed path providing for travel of the articles therebetween, plural radiant heater strips supported on each casing and contoured and arranged to be opposite a select surface area of the articles as they travel in said path between the casings, said heater strips extending parallel to the movement of said select area of the articles and energized to radiate heat toward those said areas as the articles are moved between said heater means, and means engageable with the chucks during movement along said heater means for rotating the articles about their axes to annularly apply said heat uniformly on said select area of the articles.

6. The combination of a movable carriage including article holding chucks and adapted for movement of the latter in a fixed path, the article chucks adapted to receive and carry articles thereon disposed perpendicular to said path of movement, a plurality of elongated radiant heater elements, means for mounting said heater elements in opposed pairs disposed in parallel relationship on either side of and along the path of movement of the articles, means for energizing said heater elements to radiate far infra-red heat therefrom, and means engageable with the chucks for rotating the articles about their longitudinal axis during travel past said heater elements, the articles being heated locally over annular selected surface areas thereof as they are moved between said heater elements.

7. The combination of a movable carriage including article holding chucks and adapted for movement of the latter in a fixed path, the article chucks adapted to receive and carry articles thereon disposed perpendicular to the said path of movement, heater means for radiating heat over a relatively narrow and elongated zone, means for mounting said heater means with said heat applying zone disposed parallel with the path of movement of articles on the chucks to apply localized heat to a surface area of the articles traveling along said zone during movement past said heater means, and means for rotating the articles during their movement past said heater means.

8. The combination of a plurality of individually regulable heaters comprising far infra-red heat sources constructed to each radiate a narrow, elongated band of said heat, means for mounting said heat sources in opposed parallel relationship to define opposed parallel bands of far infra-red heat, a traveling carriage including a plurality of article holding chucks arranged in a line on said carriage, said chucks being adapted to hold articles with their axes disposed perpendicular to the travel of said carriage, and means engageable with said carriage for guiding the articles thereon through said parallel bands of heat and means engageable with said chucks for rotating the articles to apply localized heating annularly over predetermined surface areas of the articles.

9. The combination defined in claim 8, wherein the said far infra-red heat sources are arranged in a plurality of opposed pairs, said pairs being disposed parallel with one another and spaced part in the direction along the axis of the articles that are moved past said heat sources.

10. The combination of a pair of spaced-apart, parallel, endless movable carriage elements, a plurality of cross members attached at their ends to said elements for carriage thereby, a plurality of article chucks rotatably mounted on said cross members and arranged thereon for carrying articles in a line with the central axis of each article perpendicular to the cross members, each said chuck having a rotatable driven element for rotating the chuck and an article held by it, a tank containing a bath of liquid plastic material, means in operative engagement with said carriage elements defining a fixed path of movement therefor including downwardly inclined movement for bringing the articles successively into the bath of liquid plastic material in said tank, a plurality of far infra-red heat sources, each constructed to radiate a narrow elongated band of said heat, means for mounting said heat sources in opposed pairs extending parallel on opposite sides of the path of movement of the articles prior to their movement into said bath, said pairs being disposed parallel with each other and spaced apart in the direction along the central axis of the articles as the latter are moved between the said heat sources, each pair of said heat sources being individually regulable in their intensity for applying controlled localized heat to predetermined surface areas of the articles during their movement between said pairs of heat sources, and driving means engageable with the driven element of the chucks for rotating the articles thereon during movement between said pairs of heat sources.

11. The method of applying a plastic coating on a glass bottle having sharp or pronounced contours to improve uniformity of the coating thereon comprising preheating the entire bottle to elevate its temperature, heating selected exterior surface areas of the bottle inclusive of its said contours to elevate the surface temperature of the glass at said selected areas above the temperature provided by said preheating, and immediately thereafter applying a coating of an organic plastisol material in flowable condition onto the article and over said selected surface areas.

References Cited in the file of this patent

UNITED STATES PATENTS

| | | |
|---|---|---|
| 2,755,507 | Heller | July 24, 1956 |
| 2,853,400 | Ahlbin | Sept. 23, 1958 |
| 2,894,858 | Lytle | July 14, 1959 |
| 2,981,639 | Kachele | Apr. 25, 1961 |

FOREIGN PATENTS

| | | |
|---|---|---|
| 817,226 | Great Britain | July 29, 1959 |

OTHER REFERENCES

"Product Finishing," vol. 22, No. 8, May 1958, pages 69, 70 and 72.